Feb. 22, 1944. C. F. HOTCHKISS, JR., ET AL 2,342,342
FLEXIBLE SHAFT WINDING MACHINE
Filed April 8, 1943 8 Sheets-Sheet 1
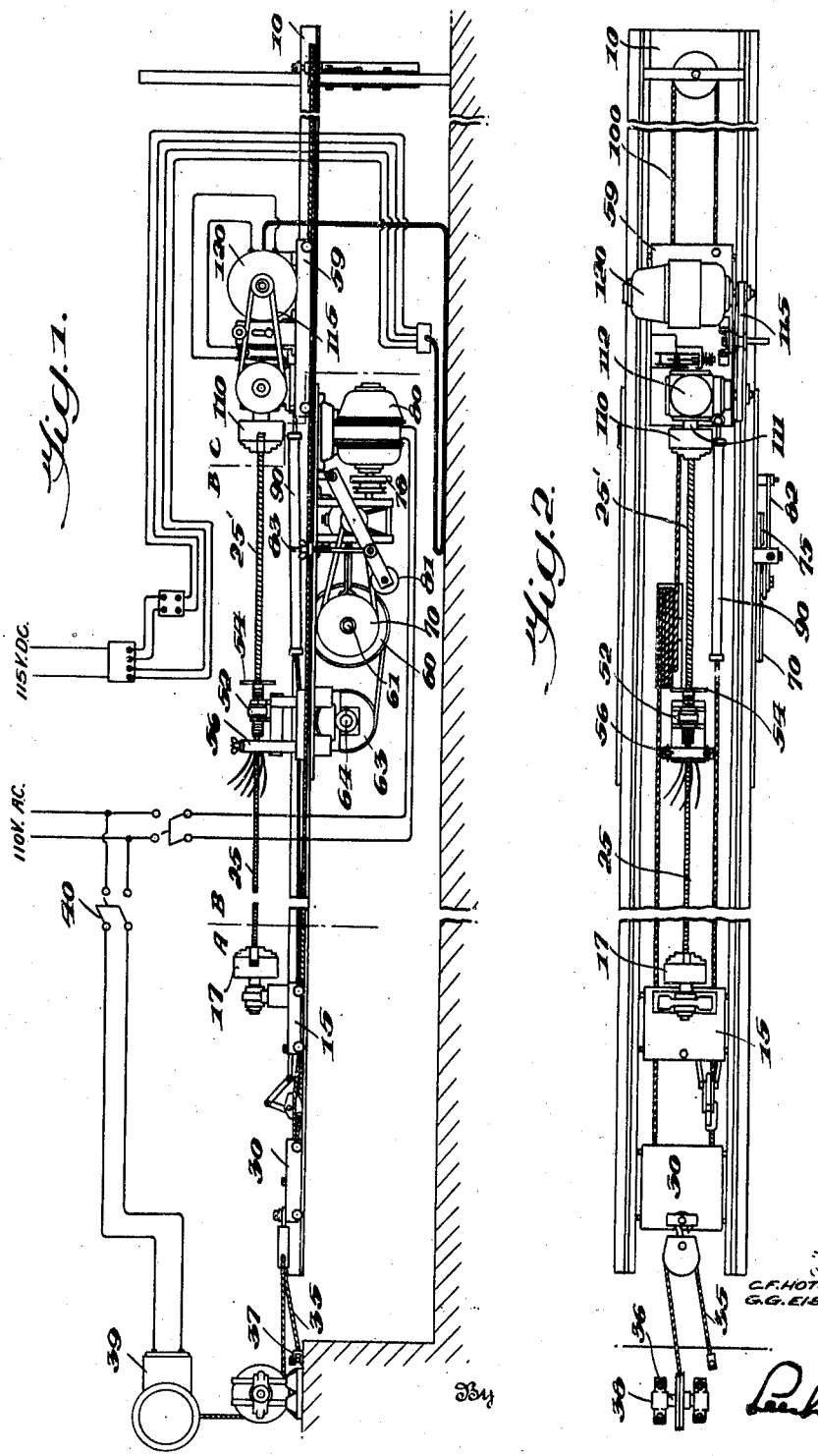

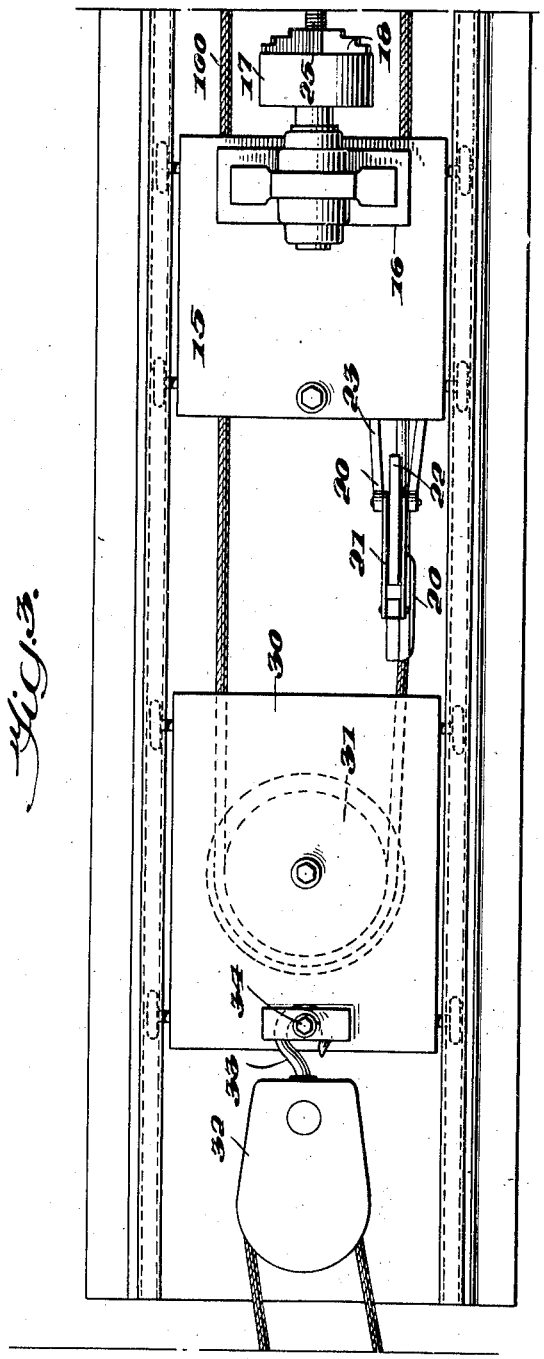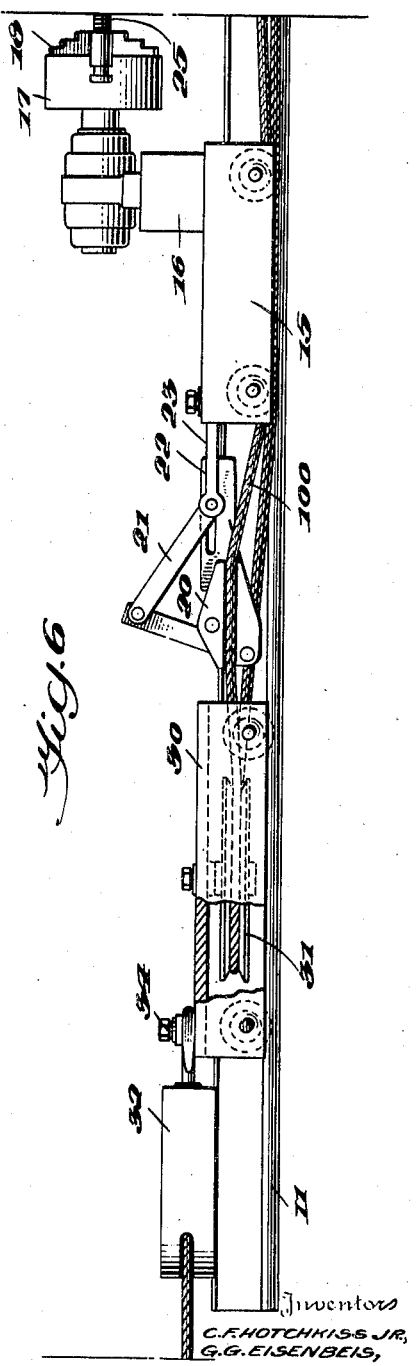

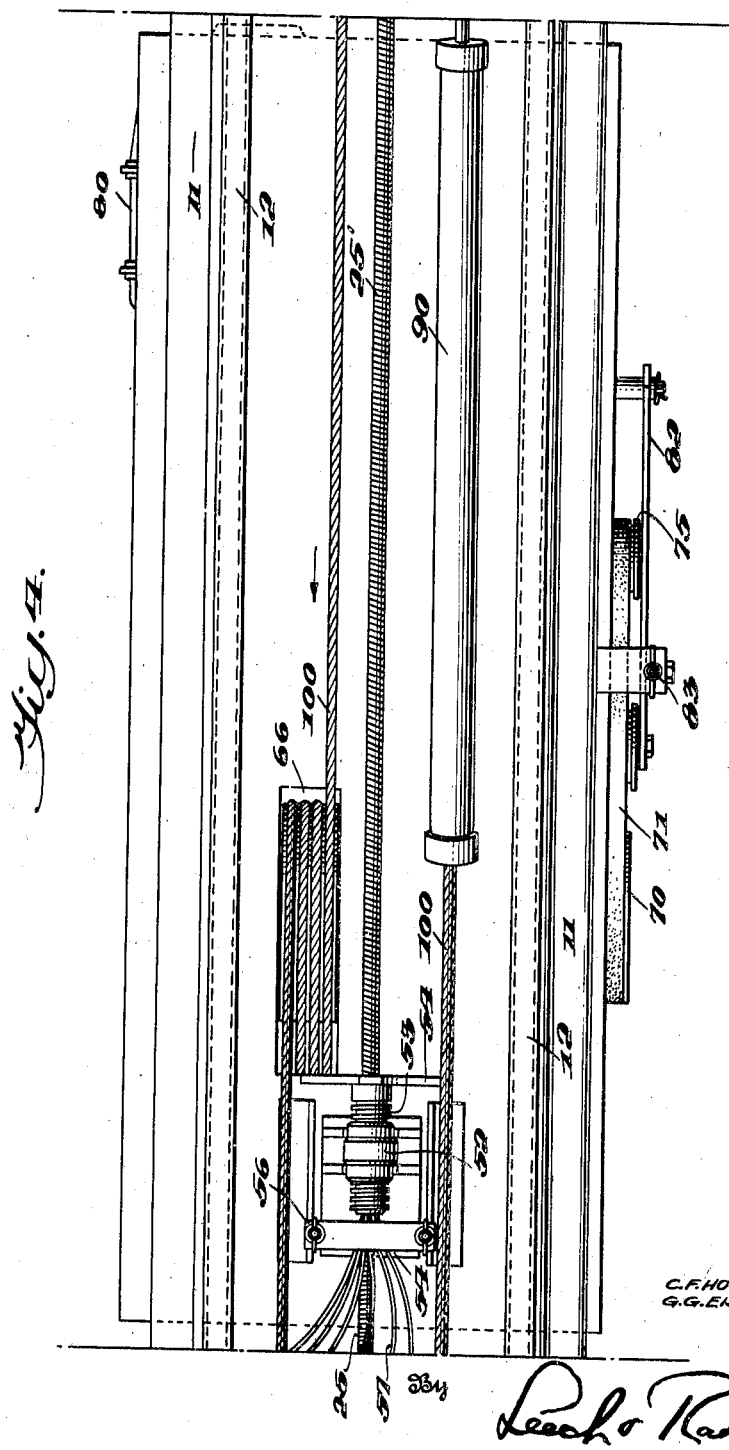

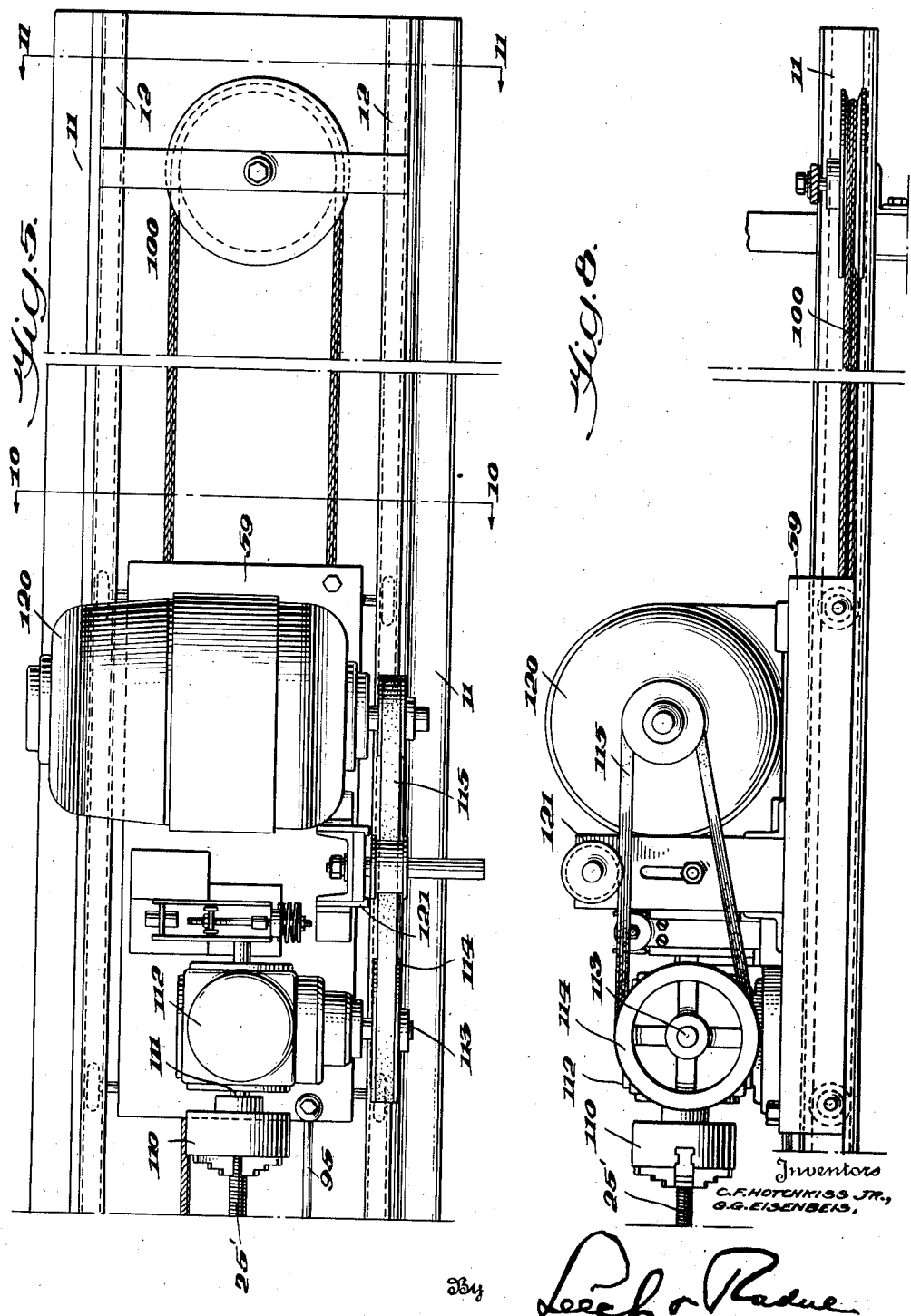

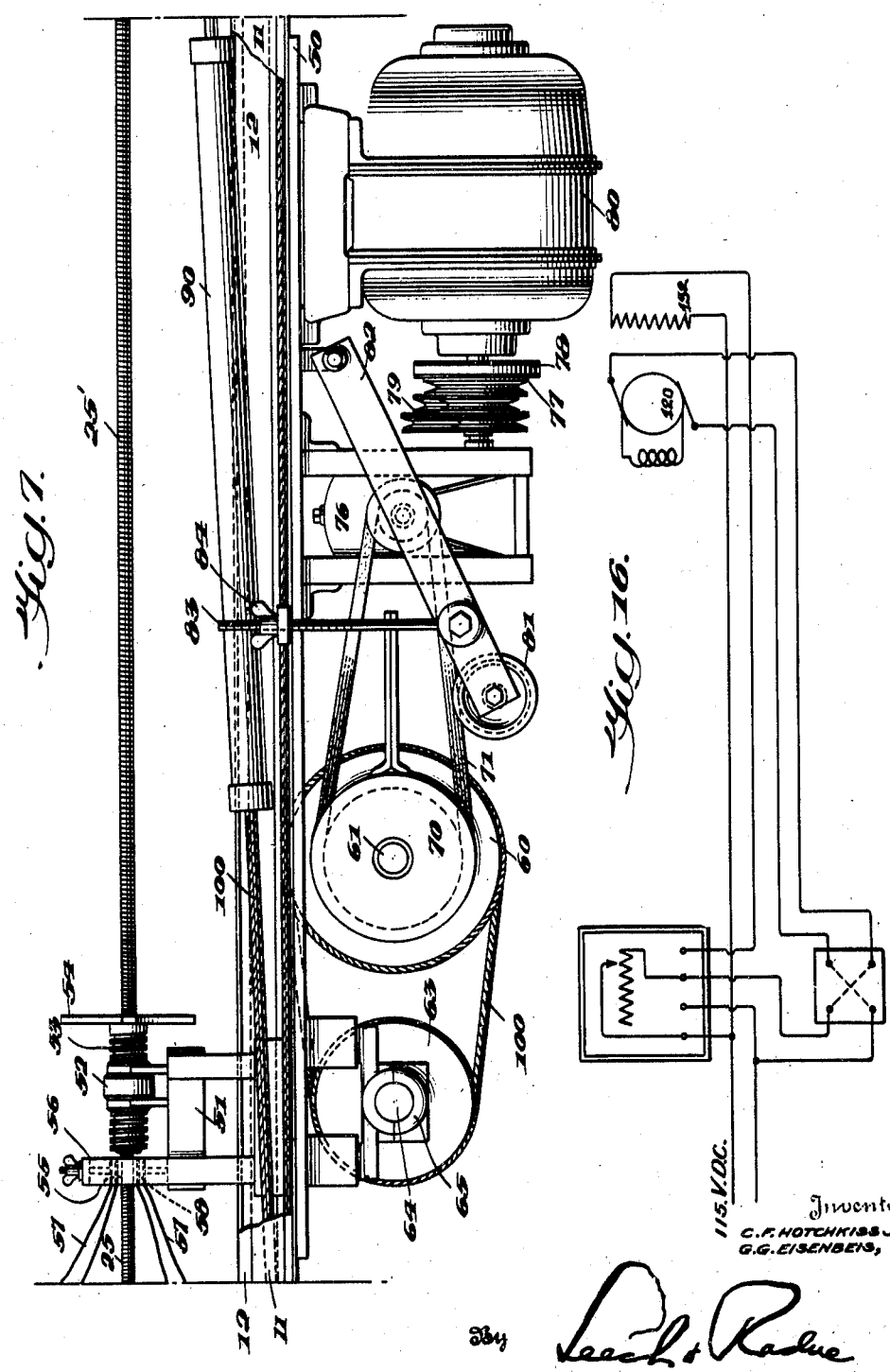

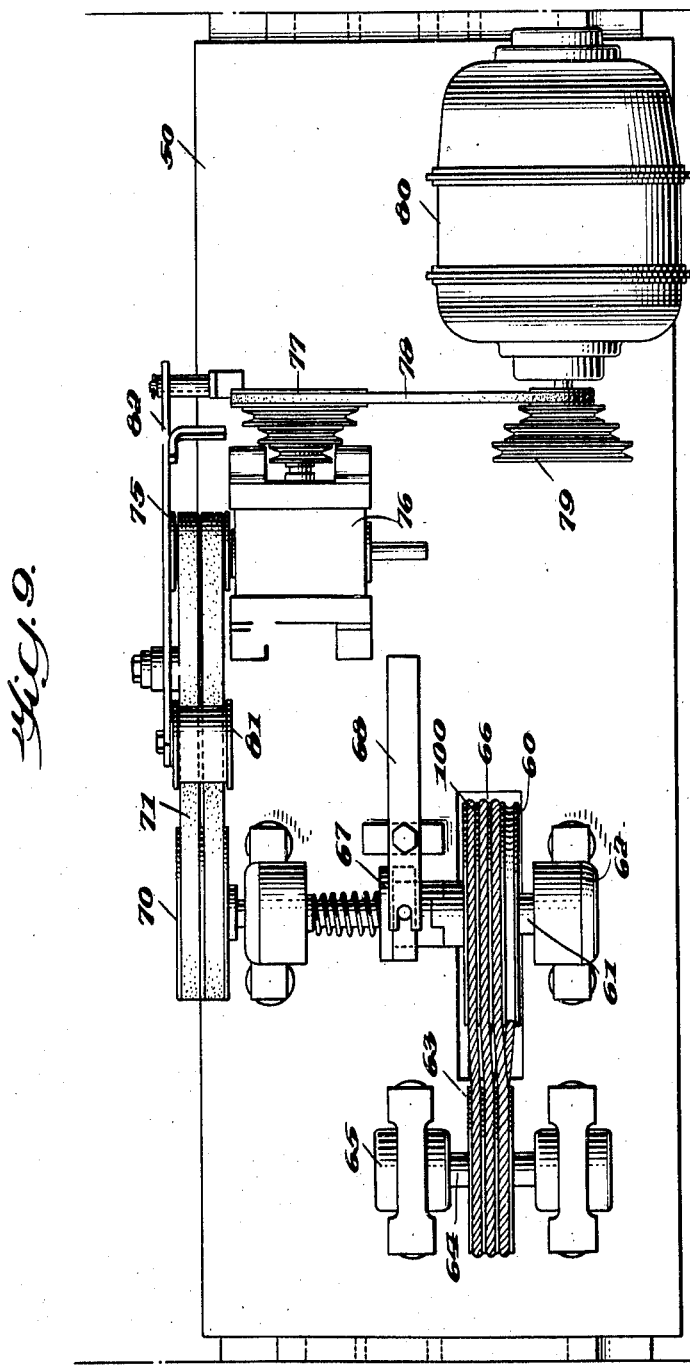

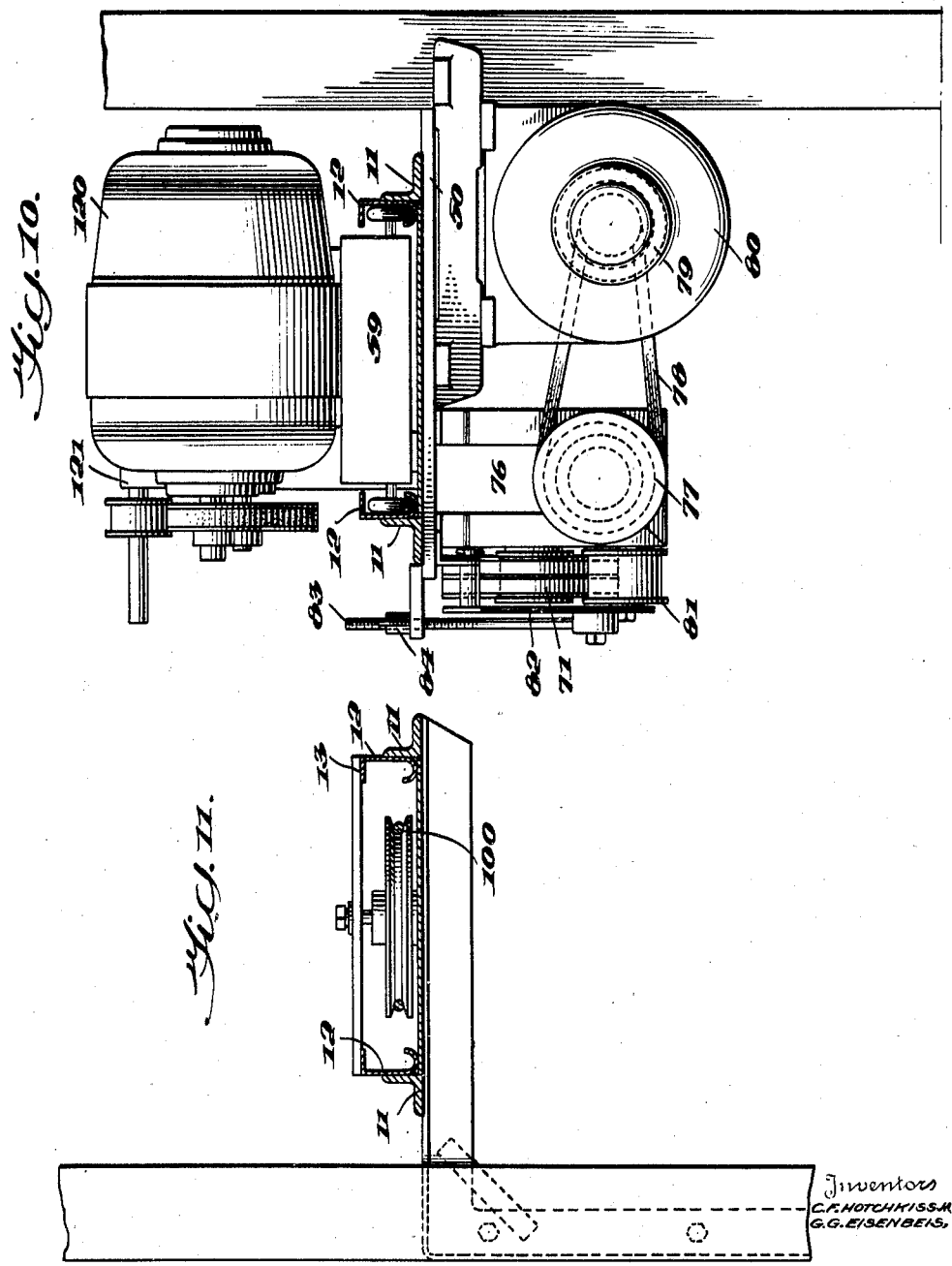

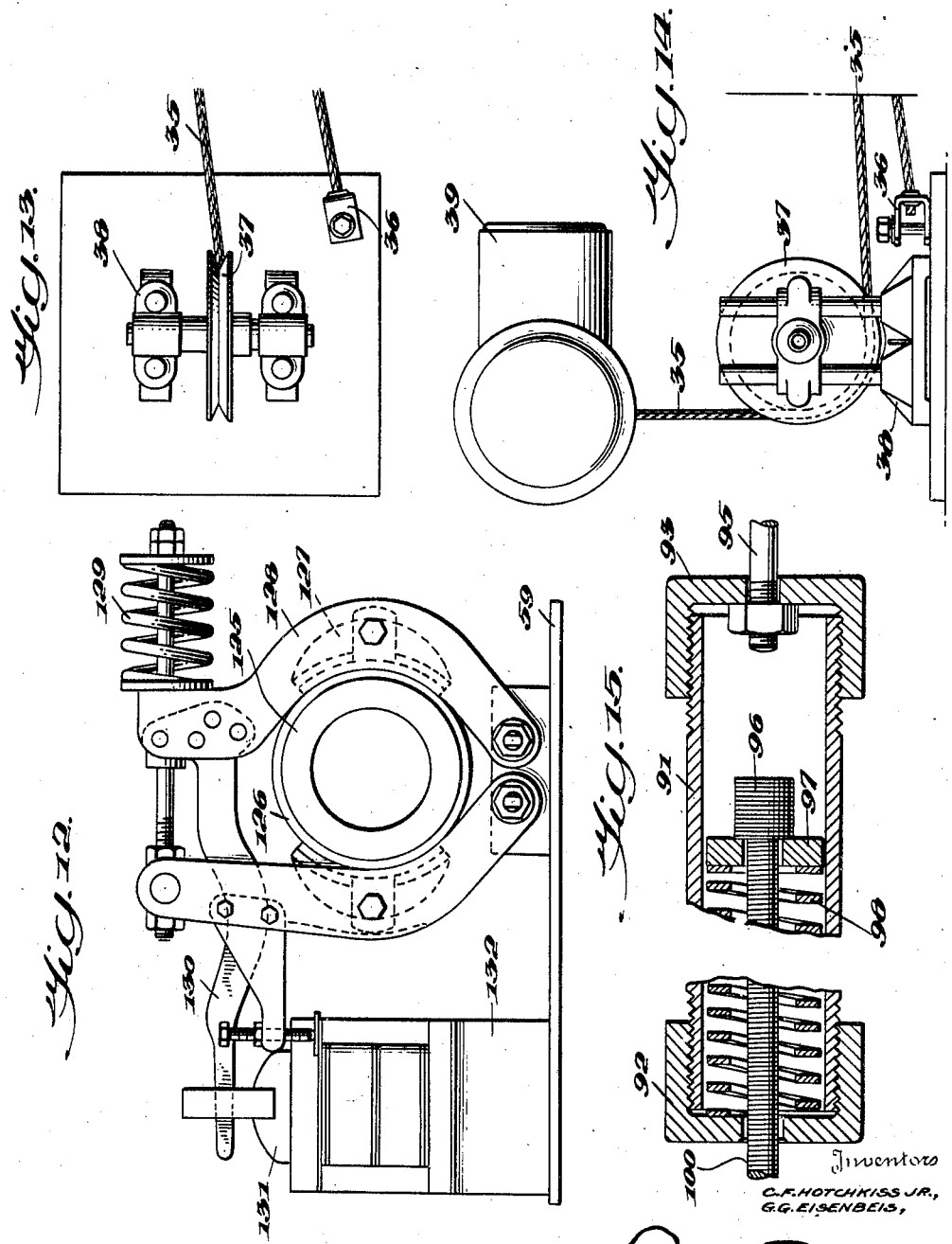

Patented Feb. 22, 1944

2,342,342

UNITED STATES PATENT OFFICE 2,342,342

FLEXIBLE SHAFT WINDING MACHINE

Clarence F. Hotchkiss, Jr., and George G. Eisenbeis, Binghamton, N. Y., assignors to Stow Manufacturing Company, Inc., Binghamton, N. Y., a corporation of New York Application April 8, 1943, Serial No. 482,298

10 Claims. (Cl. 57—11)

This invention relates to an apparatus for forming flexible shafting of the type wherein a core is wound with a plurality of superimposed wire helices or layers, the convolutions being superimposed one upon the other in oppositely wound directions. More particularly, the present machine is for the purpose of forming long lengths of large diameter flexible shafting of this general type which has heretofore been considered impossible.

Broadly, the apparatus comprises a linearly moving car having a power driven head stock thereon to which one end of a core or initially wound shafting is secured and rotated while the car is longitudinally moved along a track. The opposite end of the length of shafting being formed is retained within a freely rotatable tail stock which moves at the same speed along the track as the forward car but is maintained under a constant back pressure or drag whereby the successive layers of wire strands are applied to the moving shafting under constant tension. The flexible shafting, as it is moved forward by the car, passes through a winding tool wherein a suitable number of wire strands are directed or laid onto the core or initially wound shafting in a tight helical formation. When the entire length of shafting has been pulled through the winding tool to approximately its end the wires composing the layer which has been wound are brazed or otherwise affixed to the end of the shafting and cut. Then the entire shafting unit is removed from the headstock and tailstock. If a further layer is to be wound thereon, the shafting is again threaded through the winding tool for the application of the further layer.

Among the novel features of the present machine are the manner of progressively moving the forward car which pulls the shifting through the winding tool and simultaneously turns the shafting to lay the wires composing the layer thereon in the proper direction of rotation, the means of maintaining the length of shafting under constant tension to insure that the wire layers are wound tightly on the shaft, and, most important, the mechanism for driving or pulling the forward car to secure automatic lead control thereof which is accomplished by the slippage arrangement of the drive mechanism.

In the drawings:

Figure 1 is a diagrammatic layout of the machine as a whole showing its various component parts and the wiring diagram for energizing the several motor devices thereof;

Fig. 2 is a top plan view of the general layout showing the arrangement of the track and platform with the drag means for the tail stock car and the drive means for the head stock car and the automatic lead control giving the proper tension to the layer being wound;

Figs. 3, 4 and 5, taken in conjunction with each other, illustrate an enlarged top plan view of the several portions of the layout of the machine disclosed in Fig. 2;

Figs. 6, 7 and 8, taken in conjunction with each other, illustrate an enlarged side elevation of the several portions of the layout of the machine disclosed in Fig. 1 of the drawings;

Fig. 9 is a bottom plan view of the automatic lead control, belt slippage arrangement and forward car moving mechanism shown in Fig. 7;

Fig. 10 is a vertical section partly in cross-section of the head stock rotating mechanism and drive belt slippage arrangement taken on line 10—10 of Fig. 5 in the direction of the arrows;

Fig. 11 is an enlarged cross-section of the forward car pulley taken on line 11—11 of Fig. 5;

Fig. 12 is an enlarged view of the solenoid brake for controlling the drive of the head stock;

Fig. 13 is a detail showing the cable anchoring means tensioning the pulley for the end of the car moving cable;

Fig. 14 is a side elevation of the pulley end and cable tensioning means; and

Fig. 15 is an enlarged section of the cable tensioner or shock absorber positioned between the forward car and cable drive.

Fig. 16 is a wiring diagram.

It will be appreciated that the present machine is several hundred feet in length and to properly disclose this length the foreshortened schematic drawings of Figures 1 and 2 show a condensed machine layout composed generally of the left-hand section A, central section B, and right-hand section C. The top plan and side elevation of the machanism composing section A is shown in enlarged Figures 3 and 6. The central section B is shown in enlarged Figures 4 and 7, while the right-hand section is shown in enlarged Figures 5 and 8. Essentially, the left-hand section A consists of a tail stock car mounted on the continuous horizontal track which runs throughout the length of the machine, with means for coupling the tail stock car to the moving cable which carries the several parts of the apparatus through the machine as a whole. This section A also includes the means for keeping the flexible core or initial shafting being wound under tension.

The central section B includes a wire winding or applying tool through which the core to be wound is drawn. This section also includes the drive means for the power cable and the slippage mechanism whereby the core or initially wound shafting passing through the winding tool is automatically drawn at a uniform lead and constant tension.

The right-hand section C includes the forward shafting drawing cart on which a positively rotated head stock carrying the forward end of the shafting is secured, whereby either right or left hand rotation may be applied to the core or initially wound shafting.

For convenience, the sections A, B and C will now be described in detail whereby their operation and association with the other sections will be readily perceived. The machine as a whole is preferably mounted at a convenient height on a comparatively narrow longitudinal platform or table 10 composed of spaced parallel tracks 11 which are supported throughout their length on transverse brackets or the like to form a firm base for the machine. The tracks 11 may be of any desired form such as that shown in Figure 11 which is essentially a trough having an extended vertical outside wall 12 and inturned right angle portion 13. This track assembly supports the several moving cars of the apparatus. In the section of track shown in section A is a wheeled car 15 on which is mounted a platform 16 carrying a freely rotatable tail stock 17. One end of the shafting core or initially wound shafting 25 is secured in the tail stock 17 by a conventional chuck or other holding means 18. This arrangement permits longitudinal movement and free rotation of the end of the core or initially wound shafting 25 as a layer of convolute wire strands 25' are placed thereon as will be hereinafter described. The tail stock car 15 is provided with a rearwardly extending cable clamp or gripping device 20 preferably constructed with pivoted jaws 20 operated through levers 21, elongated slot 22 and drawbar 23 attached to the car whereby when the draft or pulling cable 100 is positioned between the jaws 20, the lever 21 will pivot the upper jaw to bind against the cable and move the car therewith. A separate car 30 is positioned adjacent the end of the track carrying a suspended horizontal pulley 31 around which the draw cable 100 passes. This end sheave car 30 is detachably secured to a pulley block 32 having a hook 33 for engagement with a vertical stud 34 secured to the car 30. The desired takeup or tension on the entire length of the drive cable 100 is secured through movement of the cable 35, having one end anchored at 37 to a base plate and with its free end passing over a vertical pulley 36 mounted in horizontal bearings 38 and running to a motor driven electrical hoist 39. Thus, when the motor circuit of the hoist 39 is energized through the switch 40, the cable 35 will be drawn up on the hoist and this, in turn, will pull the car 30 towards the end of the track and create a take-up action on the drive cable 100.

The central section B of the apparatus shown in Figures 4 and 7 includes a base plate 50 supported beneath the spaced track members 11. On the top of the platform and between the tracks 11 is mounted a winding tool assembly 51. The winding tool includes an internally threaded casing 52 for receiving an externally threaded sleeve or cylinder 53 having an operating handle 54 on the end thereof for relatively moving the sleeve 53 in the casing 52 with relation to a vertical apertured drawplate 55 which is rigidly held between spaced vertical arms 56. The wire strands 57 to be wound on the core or initially wound shafting 25 and form the layer 25' pass through apertures 58 in the drawplate 54 and due to the lineal movement and rotation imparted to the shafting the wires are applied thereon in either a right or left-hand wind. The relative position of the end of the externally threaded sleeve 53 and the drawplate 54 regulates the tightness or angle of the wind and, in practice, the sleeve 53 is positioned some distance from the drawplate as the winding operation commences and, after the machine has gotten up momentum, the handle 54 is turned to adjust the position of these parts to insure the desired angle of wind of the wire strands on the core or initially wound cable. The winding tool per se is disclosed and claimed in Patent No. 2,328,792, issued September 7, 1943, to George G. Eisenbeis.

Suspended from the underside of platform 50 is the power driving mechanism for moving the power cable 100 and advancing the forward car 59 shown in section C of the apparatus. This car 59 is normally pulled from left to right during the winding operation by advancing the cable 100 in the direction of the arrow indicated in Figure 4. The cable is positively drawn or pulled by passing several loops thereof over a grooved sheave 60 mounted on a horizontal shaft 61 having its ends secured in depending bearing brackets 62 suspended from beneath the platform 50. These loops of the drive cable also pass over a spaced smaller diameter sheave 63 mounted on horizontal shaft 64 having its ends supported in bearinged brackets 65 approximately beneath the winding tool 51. It will be observed that the periphery of the larger diameter cable sheave 60 extends upwardly through a slot 66 formed in the platform 50 whereby its periphery is slightly above the plane of the platform. Figures 7 and 9 show this drive construction in greater detail, and it will be seen that power is applied to the sheave 60 for drawing the cable through the medium of the grooved drive pulley 70 mounted on the shaft 61 and driven by belts 71 passing over flat-faced pulleys 75 which, in turn, receive their rotation through gear reducer 76 and pulley 77. The speed reduction box pulley 77 is preferably provided with a multiple diameter pulley whereby the drive belt 78 passing over the second multiple diameter pulley 79 driven by motor 80 permits great flexibility and adjustment of the speed to the cable drawing pulleys through the expedient of these double diameter pulleys and gear box 76. In winding shaftings of various diameters considerable speed variation is required and this arrangement allows the operator to increase or decrease the draw and speed at which the power cable 100 is moved. Power from motor 80 to shaft 61 may be disconnected through clutch 67 and operating handle 68.

As before stated, the double drive pulley 75 secured to the shaft of the reduction gear box 76 is of the flat-face variety whereby slippage is permitted to insure that the lead of the wire strands being applied to the shafting is uniform. Additional adjustment of the tensioning and drive belts 71 to maintain the proper contact while, at the same time, permitting slippage is secured by a pivoted belt tightener having a belt contacting roller 81 mounted on pivoted arm 82 and having a vertical arm 83 passing through an opening in the platform 50. The drive belt 71 may be tightened or loosened by adjusting the wing nut 84 screw threaded on the upper end portion of the vertical pivoted arm 83.

The drive cable 100 after passing over the sheaves 60 and 63 passes rearwardly to the pulley car 30, around pulley 31, and thence to the cable clamp 20 attached to the tail stock car 15. The cable thereafter passes beneath the tail stock car 15 and forwardly to a cable spring device 90. Figure 15 shows the construction of the cable and resilient device in which the end of the cable 100 is secured. The tubular casing 91 is fitted with apertured end caps 92 and 93 through which the end of the cable 100 passes. The opposite end cap retains the nut 94 on rod 95 secured to the forward driven car 59. An enlarged head or fastener 96 is secured to the end of the cable adjacent the washer 97 resting on coil spring 98. With this construction it is possible to initially take the slack out of the core secured between the chucks 17 and 110 without placing undue tension on the drive cable. As the machine is started up the forward or draw cart 59 moves along the track and the rear tail stock car 15 remains stationary until the slack in the core therebetween is taken up and the resilient device 90 placed under tension. The winding of the core then proceeds and a substantially uniform tension is maintained on the drive cable through the medium of the resilient device.

The right-hand section C which includes the forward car 59 is shown in detail in Figures 5, 8 and 10. A head stock 110 is mounted on the rear portion of this car with the shaft 111 thereof receiving movement through a speed reduction gear box 112. The input shaft 113 of the reduction gear box is driven by pulley wheel 114 and belt 115 connected to drive motor 120 and includes an adjustable belt tightener 121 interposed between the drive pulley 114 and motor 120. As shown in Figure 5, the drive shaft 111 for rotating the head stock extends outwardly through the opposite side of the reduction gear box 112 and terminates in an enlarged annular flange or pulley 125, having a friction surface 126 thereon. The details of this latter construction are shown in Fig. 12. The enlarged flange is adapted to be engaged by brake shoes 127 secured to pivoted arms 128 spring biased by coil spring 129 in such a manner that normally the spring acts to force the brake shoes into engagement with the flange and prevent the shaft 111 from rotating. The details of this brake construction is shown in Figure 12 and it will be here observed that one of the pivoted arms is provided with a laterally extending lever arm 130 suitably secured to the movable plunger 131 of the solenoid 132. The electric operating circuit for the solenoid is such that the plunger 131 is in raised position to relieve the contact of the brake shoes 127 on the flange 125 whenever the motor 120 is energized but, simultaneously, upon deenergization of the motor 120, the plunger 131 is drawn downwardly by the spring 129 to operate the lever arm 130 and apply the brake shoes and prevent any driving or rotation of the head stock when the motor 120 is not in operation.

In winding a core or initially wound shafting the forward car is moved to the left, as shown in the drawings, to a point adjacent the winding tool and the core or initially wound shafting is. threaded through the winding tool and the free ends of the wires comprising the layer to be wound on the core are secured to the core or initially wound shaft in the chuck of the head stock. The opposite end of the core or initially wound shaft is then secured in the chuck of the tail stock, and after clamping the rear tail stock car to the operating cable 100 the switch 40 is thrown to engage the hoist 39 and pull back the sheave gear 130 to place the entire machine and drive cable 100 under proper tension. This removes the sag from the core or initially wound cable 25 and the machine is then in condition for winding the wire layers composing the coat 25' onto the core or initially wound shafting. The cable drive motor 80 is energized whereupon the drive cable is longitudinally drawn or pulled by reason of its frictional contact with sheaves 60 and 63 and the forward car 59 pulled toward the right end of the tracks 11. Simultaneously, the head stock rotating motor 120 is put in operation to rotate the head stock shaft 111 and, as before described, the energization of the motor 120 releases the magnetic brake shoes 127 on the annular flange 125. As the head stock car continues its movement to the right the core or initially wound cable is smoothly and rapidly drawn through the winding die where the strands of wire composing the layer 25' are laid thereon in a tight, smooth helix formation. Due to the slippage permitted by the drive mechanism including the flat pulley 73 any undue friction or retarding of the wire composing the coating layer passing through the winding tool drawplate is compensated for and as before described the slippage means including the belt adjustor 81 permits delicate control of the forward speed of the shafting being wound. The operator by visual observation can readily determine if the wire layer is applied smoothly and regulate the draw or pull of the shafting to the precise condition described.

While we have described our invention as particularly applicable to winding a flexible cord, it will be appreciated that the apparatus disclosed is not so limited and may be used for applying an exterior layer to a solid rod.

What we claim is:

1. A flexible shaft winding machine including a horizontal track, a pair of spaced cars on said track, means for securing the ends of a shafting core to the said cars, means for advancing the said cars, means for positively rotating the end of the core secured to one of the said cars, said core being drawn through a wire applying device whereby a spiral layer of wire is laid up on said advancing and rotating core and means for maintaining a uniform tension on the wire layer as it is applied to the core.

2. A flexible shaft winding machine including, in combination, a track having a pair of longitudinally movable cars thereon detachably joined to a shaft core to be wound, a wire applying draw plate mounted intermediate of the said cars with the shaft core passing therethrough, wire supply means leading to said draw plate, a linearly moving cable to which said cars are secured and advanced therewith along said track, a shaft core rotating means carried on one of said cars, and means for maintaining the said cable and shaft core under uniform longitudinal tension.

3. A flexible shaft winding machine including, in combination, a longitudinal track, a wire winding tool mounted above and intermediate the length of said track, a shafting core adapted to be passed through said winding tool, an external wire supply leading to and through said winding tool to the core passed therethrough, rotatable holders attached to the ends of the shafting core adapted to be advanced along said track whereby said core is simultaneously rotated and drawn through said winding tool and a layer of wire from the external supply is wound thereon.

4. A flexible shaft winding machine as defined in claim 3, wherein the shaft core holders are wheeled cars and the means for advancing said cars is a positively drawn closed cable system to which said cars are attached, said cable system passing around horizontal pulleys arranged at the ends of said track, the drawing means for said cable system comprising a motor driven sheave arranged below the said track with its periphery protruding above the horizontal plane thereof.

5. A flexible shaft winding machine, including, in combination, a horizontal track, spaced platforms on said track, rotatable chucks carried by said platforms for holding the ends of a shaft core to be wound, motor drive means mounted on one of said platforms for rotating the chuck carried thereon, a wire applying tool positioned above said track in longitudinal alinement with said shaft core holding chucks whereby the shaft core is adapted to be drawn therethrough in a straight path, and a driven cable system arranged adjacent the plane of the said horizontal track for moving the said platforms therealong.

6. A flexible shaft winding machine as defined in claim 3, wherein the spaced platform carrying the non-driven core holding chuck is detachably secured to the driven cable system and wherein means are provided for simultaneously taking up the slack in the cable system and the shaft core held in the said chucks.

7. A flexible shaft winding machine as defined in claim 5, wherein the said cable system passes around a driven bull wheel whereby the cable is continuously advanced when said bull wheel is rotated, the driving means for said bull wheel including a belt adapted to slip when the pull on the said cable is sufficient to draw the said platform along the said track at such speed as will ensure the desired lead for a uniformly spaced layer.

8. A flexible shaft winding machine as defined in claim 5, wherein the cable system passes over horizontal sheaves positioned at the end of the said track, one of said sheaves being mounted in a platform on said track and an independently operated hoist flexibly secured to said sheave platform whereby the said platform may be drawn toward the end of said track.

9. A flexible shaft winding machine as defined in claim 5, wherein the said drawing cable to which the said chuck platforms are attached passes over pulleys positioned adjacent the ends of the horizontal track, one of said pulleys being carried on a longitudinally adjustable platform whereby slack in the cable system may be taken up, the drawing means for said cable system comprising a driven bull wheel over which said cable is passed and an adjustable belt drive from a power source for rotating said bull wheel, the said belt drive being adapted to slip on said bull wheel drive when the pull on the said cable is sufficient to draw the said platform along the said track at such speed as will ensure the desired lead for a uniformly spaced layer.

10. A flexible shaft winding machine as defined in claim 5, wherein one end of the drawing cable is rigidly attached to the platform carrying the motor driven shaft core rotating means and the opposite end of said drawing cable is attached to said platform through the medium of a resilient shock absorbing device.

CLARENCE F. HOTCHKISS, Jr.
GEORGE G. EISENBEIS.